May 5, 1936.  W. J. McNABB  2,039,818
VEHICLE SEAT MOUNTING
Filed Jan. 2, 1934
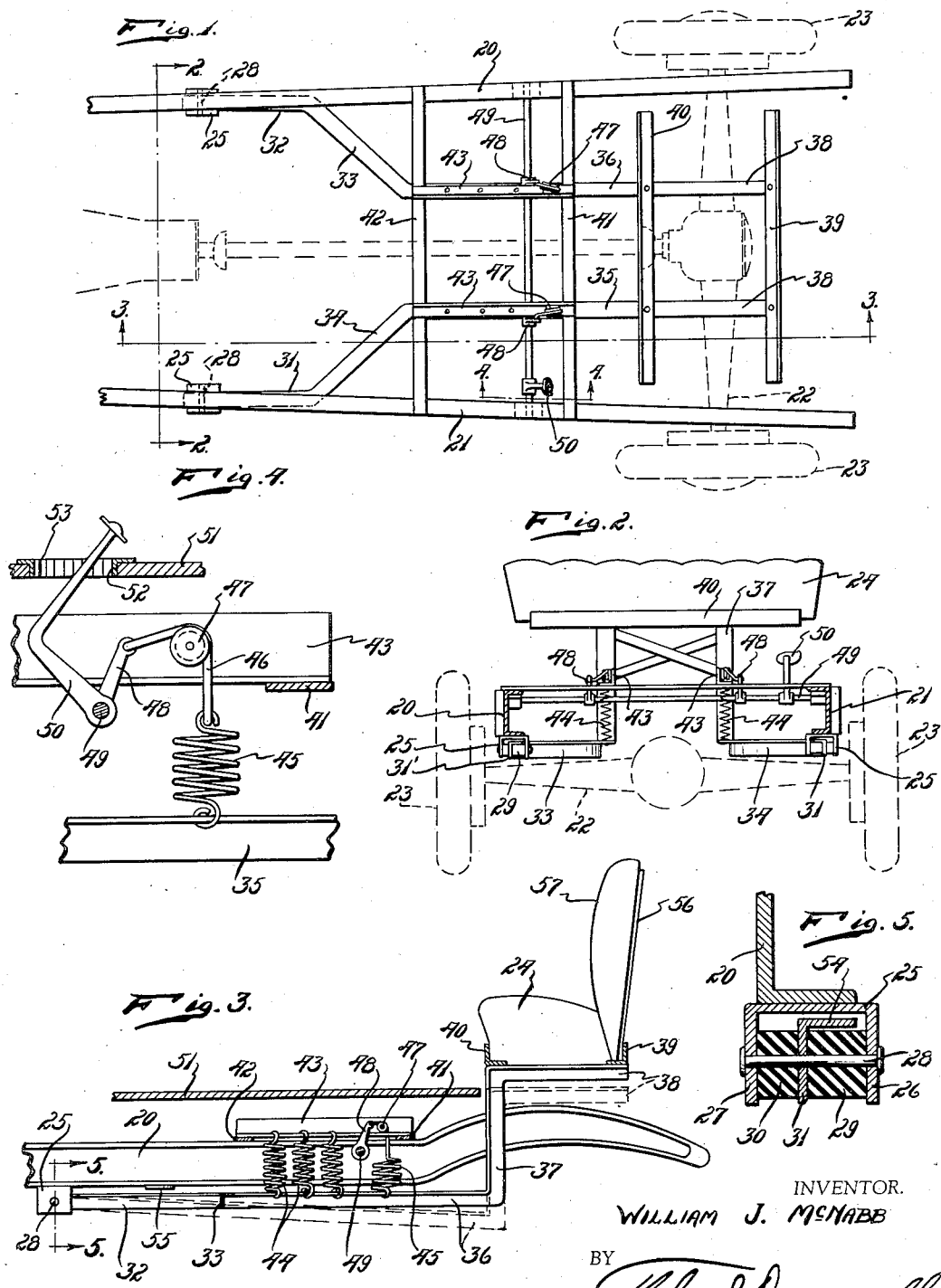
INVENTOR.
WILLIAM J. McNABB
BY
Thos. J. Donnell
ATTORNEY.

Patented May 5, 1936

2,039,818

UNITED STATES PATENT OFFICE 2,039,818

VEHICLE SEAT MOUNTING

William J. McNabb, Detroit, Mich.

Application January 2, 1934, Serial No. 704,878

4 Claims. (Cl. 155—9)

My invention relates to a new useful improvement in a vehicle seat mounting, and has for its object the provision of a mounting, whereby a comfortable and easy riding in the vehicle, with all shocks and jars reduced to a minimum is accomplished.

Another object of the invention is the provision of a vehicle seat mounting, whereby a resilient support for the seat is provided, which may be adjusted to accommodate various weights.

Another object of the invention is the provision of a vehicle seat mounting in which a seat suspended from springs is provided.

Another object of the invention is the provision of a vehicle seat mounting, whereby a centering of the load on the vehicle seat relative to the vehicle may be effected.

Another object of the invention is the provision of a vehicle seat mounting having a plurality of springs and resisting inward pressure on the seat, and so constructed and arranged that the springs may be brought into operation or rendered inoperative at will.

Other objects will appear hereinafter.

The invention consists in the combination and arrangement of parts hereinafter described and claimed.

The invention will be best understood by a reference to the accompanying drawing, which forms a part of the specification and in which Figure 1 is a top plan view of the invention, showing it applied to a vehicle chassis, a portion of which is diagrammatically illustrated.

Fig. 2 is a view taken on line 2—2 of Fig. 1,

Fig. 3 is a sectional view taken on line 3—3 of Fig. 1,

Fig. 4 is a fragmentary side elevational view of a part of the invention, taken on line 4—4 of Fig. 1, Fig. 5 is a fragmentary sectional view taken on line 5—5 of Fig. 3.

In the drawing, I have illustrated the invention used with a vehicle having oppositely disposed chassis rails 20 and 21, and provided with a rear axle 22, on which are mounted the traction wheels 23. Mounted on each of the chassis rails 20 and 21, is a U-shaped hanger 25, projecting through the legs 26 and 27 of which, is the pivot bolt 28, which also projects through the rubber spacer blocks 29 and 30, and through the end of the supporting bars 31 and 32, so as to swingably mount these bars below the chassis rails. As shown in Fig. 1, these bars 31 and 32 are turned in toward each other, to provide the inclined portions 34 and 33 respectively. These inclined portions are again angularly turned, to provide the rearwardly directed parallel bars 35 and 36, which are upwardly turned as at 37, and again angularly turned to provide the elevated horizontal supporting portions 38. These portions 38 are connected by the supporting angle irons 39 and 40, to provide a supporting cage for the seat 24.

Connecting the chassis rails 20 and 21, intermediate their ends, are the transverse bars 41 and 42, which serve as supports for the connecting bars 43. These bars 43 over-lie the parallel portions 35 and 36. Connected at one of their ends to the bars 43, and at their lower ends to the bars 35 and 36, are the springs 44. An auxiliary spring 45 is connected at its lower end to each of the bars 35 and 36, and at its upper end to a cord 46, which passes around the pulley 47 and connects to the crank 48, fixedly mounted on the shaft 49, which extends transversely of the chassis and is journalled at its opposite ends in the chassis rails 20 and 21. A pedal 50 is fixedly mounted upon the shaft 49, for rocking the same. The floor 51 of the vehicle body is cut away as at 52, and a toothed plate 53 placed therein, for engaging the pedal 50 and locking it in its various positions of adjustment.

From this description, it will be seen that the seat is carried by a pivotally mounted frame, and that the downward movement of the frame is resisted by the springs 44, and also by the spring 45, when this downward movement reaches a predetermined degree. By rocking the shaft 49, the tension of the spring 45 may be adjusted, so that the resistance to downward movement may be regulated, depending upon the load which is placed upon the seat. As shown in Fig. 3, the supporting frame would move under normal conditions, to the dotted line position. The horizontal directed portion 54 of the angle iron, through its engagement with the spacing blocks 29 and 30, which are clamped in fixed position, will serve as a snubber for resisting upward movement of the said supporting frame. When this upward movement reaches a predetermined degree, the portions 31 and 32 of the supporting rails will engage the yieldable or rubber block 55, mounted on the under surface of the chassis rails. Supporting plates 56 are projected upwardly from the angle iron 39, to serve as a support for the seat back 57.

It is believed obvious that by mounting the said supporting frame in this manner, the advantages sought are accomplished, and an easy riding of the vehicle becomes possible, while the jarring and jolting of the occupant of the seat is reduced to a minimum. Furthermore, the weight of the occupant is transmitted to the chassis well forwardly of the rear axle, so that a centering of the load on the chassis frame thus becomes possible.

While I have illustrated and described the preferred form of construction, I do not wish to limit myself to the precise details of structure shown, but desire to avail myself of such variations and modifications as come within the scope of the appended claims.

Having thus described my invention, what I claim as new and desire to secure by Letters Patent is:

1. In combination with a vehicle chassis having oppositely disposed side rails; a seat supporting structure comprising a pair of spaced supporting bars; means for pivotally connecting each of said bars to one of said rails below the same, said bars being angularly turned inwardly toward each other, intermediate their ends, and thence extending rearwardly in paralleled spaced relation, the ends of the paralleled spaced portions of said bars being upwardly offset and angularly turned to provide an elevated horizontal rear portion; transversely extending bars at opposite ends of said elevated rear portions, for connecting the same and providing a seat supporting frame; a plurality of springs for resisting downward rocking movement of said supporting bars; supporting means mounted on said rails, the upper ends of said springs being attached to said supporting means and the lower ends thereof being attached to said supporting bars; auxiliary springs for resisting downward movement of said supporting bars; rockable means for moving said auxiliary springs into operative and inoperative relation to said bars; and means for locking said rockable means in various positions of rocking movement.

2. In combination with a vehicle chassis having oppositely disposed side rails; a seat supporting frame comprising a pair of supporting bars in spaced relation; means for pivotally mounting the ends of said bars to the under side of said chassis rails, said bars being angularly-turned inwardly toward each other, intermediate their ends, and extended therefrom in parallel spaced relation, the rear ends of said bars being upwardly turned and then extended horizontally; connecting bars extending transversely of the elevated portions and connecting the same together and providing therewith a seat supporting frame; and resilient means connected to said chassis rails and to said supporting bars and resisting swingable movement of said bars in one direction relatively to said chassis rails.

3. In combination with a vehicle chassis having oppositely disposed side rails; a seat supporting frame comprising a pair of supporting bars in spaced relation; means for pivotally mounting the ends of said bars to the under side of said chassis rails, said bars being angularly-turned inwardly toward each other, intermediate their ends, and extended therefrom in parallel spaced relation, the rear ends of said bars being upwardly turned and then extended horizontally; connecting bars extending transversely of the elevated portions and connecting the same together and providing therewith a seat supporting frame; resilient means connected to said chassis rails and to said supporting bars and resisting swingable movement of said bars in one direction relatively to said chassis rails; and means for adjusting the tension of said resilient means.

4. In combination with a vehicle chassis having oppositely disposed side rails; a seat supporting structure comprising a pair of spaced supporting bars; means for pivotally connecting one end of each of said bars to the chassis side rails to position said bars below the same, said bars being angularly-turned inwardly toward each other, intermediate their ends; and thence extending rearwardly in parallel spaced relation, the parallel spaced portions of said bars being, adjacent their ends, upwardly offset and angularly-turned to provide an elevated horizontal rear portion; transversely extending connecting bars at opposite ends of said elevated horizontal rear portions for connecting the same and providing a seat supporting frame; a plurality of springs connected to a stationary part of said chassis and depending therefrom and connected at their lower ends to said supporting bars for resisting downward rocking movement of said supporting bars; auxiliary springs for resisting downward movement of said supporting bars; and rockable means for moving said auxiliary springs into operative and inoperative relation to said supporting bars.

WILLIAM J. McNABB.